US007025886B2

(12) United States Patent
Viklund et al.

(10) Patent No.: US 7,025,886 B2
(45) Date of Patent: Apr. 11, 2006

(54) MATERIAL

(75) Inventors: Camilla Viklund, Umea (SE); Knut Irgum, Bullmarak (SE)

(73) Assignee: Sequant AB, Umea (SE)

( * ) Notice: Subject to any disclaimer, the term of this patent is extended or adjusted under 35 U.S.C. 154(b) by 177 days.

(21) Appl. No.: 10/473,415

(22) PCT Filed: Mar. 25, 2002

(86) PCT No.: PCT/SE02/00589

§ 371 (c)(1),
(2), (4) Date: Mar. 10, 2004

(87) PCT Pub. No.: WO02/079284

PCT Pub. Date: Oct. 10, 2002

(65) Prior Publication Data

US 2004/0138432 A1 Jul. 15, 2004

(30) Foreign Application Priority Data

Mar. 30, 2001 (SE) .................................. 0101153

(51) Int. Cl.
*B01D 15/08* (2006.01)

(52) U.S. Cl. .................. 210/656; 210/635; 210/198.2; 210/502.1; 502/402; 502/439; 526/204

(58) Field of Classification Search ................ 210/635, 210/656, 659, 198.2, 502.1; 502/402, 439; 526/204

See application file for complete search history.

(56) References Cited

U.S. PATENT DOCUMENTS

| | | | | |
|---|---|---|---|---|
| 3,663,263 | A | 5/1972 | Bodre et al. | |
| 5,552,502 | A * | 9/1996 | Odell et al. | 526/234 |
| 5,728,747 | A * | 3/1998 | Kazmaier et al. | 522/11 |
| 5,744,560 | A * | 4/1998 | Foucher et al. | 526/221 |
| 6,156,858 | A * | 12/2000 | Keoshkerian et al. | 526/204 |
| 6,281,311 | B1 * | 8/2001 | Lai et al. | 526/220 |

OTHER PUBLICATIONS

Macromolecules, Volym 32, 1999, EC Peters et al, "Control of Porous Properties and Surface Chemistry in "Molded" Porous Polymer Monoliths Preplared by Polymerization in the Presence of TEMPO" p. 6377-p. 6379.

(Continued)

*Primary Examiner*—Ernest G. Therkorn
(74) *Attorney, Agent, or Firm*—Young & Thompson

(57) ABSTRACT

The present invention provides porous monoliths with high flow permeability that can be produced by polymerising and divinylbenzene in the presence of an initiator, a carboxy-functionalized nitroxide stable free radical and polymeric porogens. The monoliths produced with these stable free radicals functionalized with carboxylic groups feature porosities very different from those produced by polymerizations involving other SFRs, characterized by very large surface areas in combination with relatively large through-pores. The invention also provides a method for producing the monoliths, a column containing the monoliths and an assay method using the column.

15 Claims, 10 Drawing Sheets

OTHER PUBLICATIONS

Macromolecules, Volym 28, 1995, RPN Veregin et al, "Mechanism of Living Free Radical Polymerizations with Norrow Polydisperisity: Electron Spin Resonance and Kinetic Studies", p. 4391-p. 4398.

Chem. Mater, Volym 8, 1996, Camilla Viklund et al, "Monolithic, "Molded", Porous Materials with High Flow Characteristics for Separations, Catalysis, or Solid-Phase Chemistry: Control of Porous Properties during Polymerization" p. 744-p. 750.

Macromolecules, Volym 34, 2001, Camilla Viklund et al, "Preparation of Porous Poly(styrene-co-divinylbenzene) Monoliths with Controlled Pore Size Distributions Initiated by Stable Free Radicals and Their Pore Surface Functionlization by Grafting" p. 4361-p. 4369.

* cited by examiner

MATERIAL

REFERENCE TO RELATED APPLICATIONS

This application is a 371 of PCT/SE02/00589 filed Mar. 25, 2002.

NEW MATERIAL

The present invention relates to a novel column-packing material suitable for size-exclusion chromatography and a method for producing this material. It also relates to a column containing the material, use of a carboxy-functionalized nitroxide stable free radical as well as polymeric porogens in a method for producing a column-packing material, and finally, a method for separating different compounds present in a liquid phase using a column containing the novel column-packing material.

TECHNICAL BACKGROUND

Stable free radical (SFR) mediated "living" polymerization has found use in various branches of polymer chemistry during the last decade, since it provides a new platform for controlling the free radical polymerization process[1]. A series of papers report on the synthesis of linear polymers of well defined molecular weights, the preparation of graft-[2] or block-[3] copolymers, and on polymerizations in emulsion[4] or dispersion[5]. Most of these reports are exploiting the common features of SFR mediated polymerization systems, which are controlled rate of monomer incorporation into the growing polymer chain, a minimum of termination reactions compared to traditional free radical polymerization, and control of end group functionality or molecular shape and size.

It has recently been reported that porous poly(styrene-co-divinylbenzene) [poly(S-co-DVB)]monolithic polymers can be prepared in the presence of the stable nitroxide radical 2,2,6,6-tetramethylpiperidinyl-1-oxy (TEMPO) by a mold polymerization process including the mono- and divinylic monomers as well as a porogenic solvent and a conventional free radical polymerization initiator[6]. The pore size distribution of these monolithic polymers differs fundamentally from the typical bimodal pore size distribution of poly(S-co-DVB) monoliths prepared without an SFR in the polymerization mixture[7]. For instance, the specific surface area was more than one order of magnitude higher (>300 $m^2/g$) compared to monoliths prepared in "traditional" mold polymerizations without added TEMPO, at polymerization temperatures between 55 and 80° C. The pore size distribution was found to range from more than 1,000 nm to less than 10 nm, which rendered the monoliths, when used as a column packing material, more capable of separating molecular weight standards in size exclusion chromatographic (SEC) mode, compared to monolithic materials with a more pronounced bimodal pore size distribution. This porosity was attributed to be due mainly the high temperatures (>120° C.) required to accomplish the polymerization in the presence of TEMPO. The possibility to using the TEMPO radical, reversibly trapped during the mold polymerization, for carrying out grafting with different monomers on crushed monolith substrates has also been reported.

In spite of these promising characteristics, stable free radical (SFR) mediated polymerization of porous objects in closed molds yielded polymers with a high flow impedance. Good permeability at a relatively low back-pressure is essential for chromatographic and other flow applications, which made the monolithic columns prepared with TEMPO as SFR impractical. It is also essential to find faster polymerization systems requiring lower polymerization temperatures in order to broaden the class of monomers feasible for grafting, without excessive grafting due to thermally generated homopolymers[8]. This would cause a loss of SFR control, which is the primary advantage of SFR mediated polymerization.

Accordingly, there is a need for an improved polymerisation method in order to be able to produce monoliths that show improved flow permeability characteristics in size-exclusion chromatography.

SUMMARY OF THE INVENTION

The present invention provides porous polymers with high flow permeability that can be produced by polymerising styrene and divinylbenzene in the presence of an initiator, a carboxy-functionalized nitroxide stable free radical and polymeric porogens. The monoliths produced with these stable free radicals functionalized with carboxylic groups feature porosities very different from those produced by polymerizations involving other SFRS, characterized by very large, surface areas in combination with relatively large through-pores. The invention also provides a method for producing the polymers, a method for subsequent use of the carboxy-functionalized nitroxide to achieve hydrophilization of the internal surface of the porous polymer, a column containing the porous polymer and a method using the column.

DETAILED DESCRIPTION OF THE INVENTION

This invention provides a method to prepare highly permeable poly(S-co-DVB) monoliths suitable for flow-through applications, and can be prepared by utilizing a carboxy-functionalized nitroxide stable free radical as mediators during the polymerization process. Examples of such stable free radicals are the commercially available compounds carboxy-PROXYL and carboxy-TEMPO. It is also demonstrated that these SFRs accelerate the kinetic of polymerization, and that the dormant radicals at the surface of the pore structure can be utilized for in situ grafting of hydrophilic monomers. The porosity and permeability of the monoliths can also be further affected by carrying out the polymerization in the presence of polymeric porogens.

As disclosed herein, the term "monolith" relates to a interconnected organic porous polymer structure. A monolith can be prepared by polymerization in a mold.

As disclosed herein, the term "initiator" relates to initiators commonly used within the field of radical polymerization, such as peroxides and peroxo acids. A preferred initiator in the present method is dibenzoyl peroxide (BPO).). A photo-initiator such as benzoin methyl ether could also be used.

As disclosed herein, the term "carboxy-functionalized nitroxide stable free radical" relates to stable radicals having a structure according to formula I below:

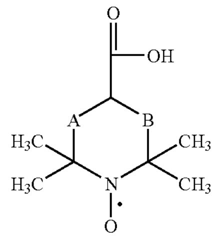

wherein A and B independently of each other can be a bond or an alkyl chain comprising 1–3 carbon atoms. Examples of such radical that can be used according to the present invention are 3-carboxy-2,2,5,5-tetramethylpyrrolidinyl-1-oxy (abbreviation: carboxy-PROXYL) and 4-carboxy-2,2,6,6-tetramethylpiperidinyl-1-oxy (abbreviation: carboxy-TEMPO).

As disclosed herein, the term "porogen" relates to compounds that might affect porosity of monoliths produced according to the present invention. The porogens are included in the polymerization reaction mixture. Suitable porogens are alchohols comprising 1–15 carbon atoms, such as 1-decanol. According to the present invention, polymeric porogens are always during manufacture of monoliths. Polymeric porogens that can be used in the inventive method are polymers of aliphatic dialcohols, such as poly(ethylene glycol)(PEG) and poly(propylene glycol).

As disclosed herein, the term "hydrophilic monomer" relates to monomers comprising hydroxy groups, or other polar groups, where said monomers are suitable for being grafted to poly(styrene-co-divinylbenzene). The experimental work behind the present application has been carried out with HEMA (2-hydroxyethyl metacrylate).

Other successful grafting experiments of hydrophilic monomers using carboxy-functionalized nitroxides include n-isopropylacrylamide, and N,N-dimethyl-N-methacryloxyethyl-N-(3-sulfopropyl)ammonium betaine.

As disclosed herein, the term "monomer comprising an ion-exchanging group" relates to monomers comprising a cation-exchanging, or anion-exchanging group that is commonly used in ion exchange chromatography or a zwitterionic group that can be used in ion exchange chromatography, where said monomers are suitable for being grafted to poly(styrene-co-divinylbenzene). The experimental work behind the present application has been carried out with sulfopropyl methacrylate.

As already mentioned the invention also relates to a column-packing material consisting of monoliths produced by the inventive method, as this column-packing material shows unexpectedly advantageous permeability and separation characteristics in size-exclusion chromatography compared to materials according to the state of the art.

The invention also provides a chromatography column, preferably a column suitable for a liquid chromatography (LC) system, which contains the inventive column-packing material.

Finally, the invention provides a chromatographic separation method in which a liquid phase containing different compounds is transported through a column containing the inventive column-packing material.

Accordingly, for the first time, porous monoliths with high flow permeability suitable, in practice, as separation media have been prepared using a stable free radical approach, producing high surface area poly(S-co-DVB) polymers reversibly capped with carboxy-PROXYL or carboxy-TEMPO. The monoliths produced with these stable free radicals functionalized with carboxylic groups feature porosities very different from those produced by polymerizations involving other SFRs, characterized by very large surface areas in combination with relatively large through-pores. The mechanism responsible for establishing this unusual pore structure may involve a repulsion mechanisms which actively prevent the growing chains inside the micropores from coalescing. A new porogen system including polyethylene glycol and 1-decanol allows the pore size distribution to be finely tuned by simply altering the ratio between the porogen constituents. The broad pore size distribution of these polymers showed encouraging SEC using conventional SEC column dimensions. In situ grafting of vinylic monomers achieved in the pore structure of the monoliths yields modified resins with cation-exchange or hydrophilic surface groups.

The invention will now be described with reference to the enclosed figures, schemes and tables, in which:

Table 1 presents surface areas and flow permeabilities of poly(S-co-DVB) monolites;

BRIEF DESCRIPTION OF THE DRAWINGS

Scheme 1 shows structures of stable free radicals used as mediators in the polymerization of poly(S-co-DVB) monoliths.

DESCRIPTION OF THE PREFERRED EMBODIMENTS

Figure 1:
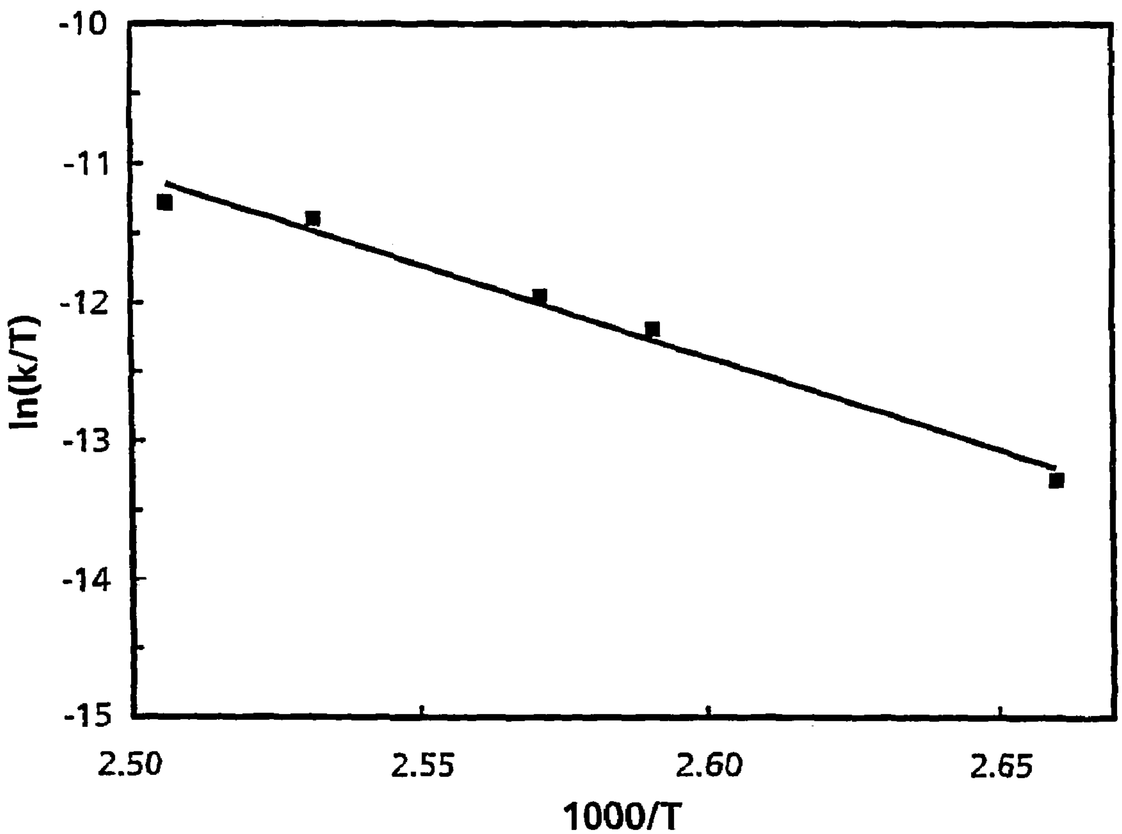
FIG. 1 discloses an Arrhenius plot based on the initial rate of radical release at different temperatures from poly(styrene-co-divinylbenzene) monoliths synthesized with a BPO:carboxy-PROXYL molar ratio of 1:1.3.

The invention will now be further described in the following experimental section. It is to be understood that the experimental results are provided for information purposes and they shall not be construed as limiting the scope of the present invention.

Experimental Section

Chemicals. The monomers styrene (99%; Aldrich, Steinheim, Germany) and divinylbenzene (DVB, 70–85% mixtures of isomers; Fluka, Buchs, Switzerland), were freed from polymerization inhibitors using batch shaking for at least 24 hours with basic $Al_2O_3$ (>approx. 0.1 g/mL monomer; Brockmann I, standard grade; Aldrich). 2-Hydroxyethyl methacrylate (HEMA) was purchased from Fluka, while 3-sulfopropyl methacrylate was obtained from Aldrich. Dibenzoylperoxide (BPO, 97%), 3-carboxy-2,2,5,5-tetramethylpyrrolidinyl-1-oxy (carboxy-PROXYL), 2,2,6,6-tetramethylpiperidinyl-1-oxy (TEMPO, 99%), 4-carboxy-2,2,6,6-tetramethylpiperidinyl-1-oxy (carboxy-TEMPO, 97%), 4-amino-2,2,6,6 -tetramethylpiperidinyl-1-oxy (amino-TEMPO, 97%), and 4-acetamido-2,2,6,6-tetramethylpiperidinyl-1-oxy (acetamido-TEMPO, 98%) were purchased from Aldrich and used without further purification. 4-Trimethylammonium-2,2,6,6-tetramethylpiperidin-1-oxy iodide (cat 1) (trimethylammonio-TEMPO iodide) was purchased from Molecular Probes (Eugene, Oreg., USA). Polyethylene glycol (PEG 400) was obtained from Aldrich.

Preparation of Polymers. A typical porous polymer is prepared by dissolving the initiator (BPO) and the SFR in a solution containing divinylbenzene and styrene at 1:1 weight ratio and porogen which was a binary mixture of varying amounts of PEG 400 and 1-decanol. The initiator:SFR ratios are the molar concentration ratios between the BPO initiator before decomposition into radicals, and the SFR. After sonication for 10 minutes and purging with helium for 10 minutes, the solutions were transferred to stainless steel columns (50 mm by 8 mm i.d., except for the column prepared as substrate for sulfopropylmethacrylate grafting which was 50 mm by 2.6 mm i.d.), provided with stainless steel fittings and equipped with PTFE seals at the bottom and top, in order to prevent any leakage during the polymerization. The polymerizations were all carried out at 130° C. for 10 hours in the vertical position using a stirred, thermostated oil bath, unless indicated otherwise. Reference poly(S-co-DVB) monoliths were synthesized according to the above description, but with the SFR excluded from the polymerization solution, and at the temperatures indicated.

Size Exclusion Chromatography. After the polymerizations had been completed, the ends of the columns were equipped with stainless steel frits and high performance liquid chromatography (BPLC) fittings. The soluble compounds still remaining in the monolith pore structure were removed by pumping at least 100 mL of THF at a flow rate of 0.2 mL/min. The columns were then connected to an HPLC system and equilibrated with 0.5 mL/min of THF, using a HPLC pump. The pore size distributions of the monoliths were determined by size exclusion chromatography using polystyrene standards (1 mg/mL, Polymer Laboratories, Shropshire, UK), having molecular weights ranging between 580 and 3,220,000, and THF as the mobile phase. The polystyrene probes were injected through a Rheodyne (Cotati, Calif.) model 7125 loop injector with a 20 µl stainless steel injection loop. The detector signals were recorded on a Hewlett Packard (Palo Alto, Calif.) model 3396A integrator. The retention volume for each polystyrene standard injected was normalized to the retention volume for polystyrene of $M_W$ 580.

Scanning Electron Microscopy. The polymer samples were placed on sticky carbon foils which were attached to standard aluminum specimen stubs. The polymer was coated with about 20 nm of gold by using sputter coating (Edwards S150A Sputter Coating Unit, Edwards High Vacuum, incorporating an automatic tilting and rotation device). Microscopic analysis of all samples was carried out in an S-360 iXP SEM (Leo Electron Microscopy Ltd., Cambridge, UK) operated in $LaB_6$-mode, 10 kV, 100 pA probe current, and 0° tilt angle.

Surface Area Analysis. The polymer samples were dried for 48 h at 80° C., whereafter they were cut to cubiform pieces with approx. 2–3 mm sides. The surface area was obtained from the desorption isotherm of nitrogen using a FlowSorb II 2300 instrument (Micromeritics, Norcross, Ga.). Three surface area measurements were made for each sample and the values are given as mean±standard deviation.

Electron Spin Resonance (ESR) Measurements. After the chromatographic evaluation of the monoliths had been completed, the polymeric material was removed from the columns and thereafter ground to powders. The THF eluent was evaporated from the ground polymers at room temperature for approx. 24 h and the samples were then weighed into separate NMR-tubes (approx. 11 mg polymer/tube). Spectra were collected using a Bruker ESP 300-E ESR spectrometer provided with a variable temperature control unit. Typically, the modulation amplitude was set to 1.0, and the modulation frequency was kept at 100 kHz for all measurements. Two scans were assigned for each time point. Spectra corresponding to t=0 were measured at room temperature (298 K). The sample tubes were then removed from the spectrometer while the cavity was heated to the desired temperature. When this temperature was reached, the sample was again fixed in the spectrometer cavity and spectra were collected at regular intervals. The release of carboxy-PROXYL radical was monitored and the relative concentration of radicals at each temperature was determined from double integration of the ESR spectra. The initial, linear part of the signal from carboxy-PROXYL release was used to determine the activation energy for the cleavage of the polymer-SFR bond.

Most of the ESR spectra were acquired with the materials suspended in xylene. Additional spectra from the release of carboxy-PROXYL at 398 K were also obtained using the polymers in the dry state.

Grafting Procedure. Grafting of poly(HEMA) onto monolith substrates polymerized with carboxy-PROXYL as SFR and a PEG to 1-decanol ratio of 4:1 was carried out by using a 10% (w/w) solution of HEMA in cyclohexanol. No initiator was added to the solution. The grafting solution was delivered in the column through a 3 mL loop at room temperature using a flow rate of 0.2 mL/min. The grafting reaction was allowed to proceed for 12 hours at 130° C., the column cooled to room temperature, connected to an HPLC system and washed with methanol/water 80/20 (v/v). The wettability of grafted and ungrafted samples by distilled water was estimated for the ground polymeric powders.

Grafting of poly(sulfopropylmethacrylate) was carried out according to the same procedure and with an identical grafting substrate composition as in the HEMA grafting experiment, using a solution of 1.75 g of the sulfonated monomer dissolved in 10 mL DMSO and reaction at 130° C. for 8 hours.

Conversion. The monomer conversion was calculated as a function of polymerization time for monoliths synthesized at 130° C. using stock solutions containing 25% styrene, 25% divinylbenzene, 40% PEG and 10% 1-decanol. The amount of BPO was kept at 0.5% with respect to the weight of the monomers and the molar ratios between BPO and carboxy-PROXYL were kept at 1:1.3 and 1:3 respectively. The monomer conversion was also investigated for polymerizations in presence of carboxy-TEMPO as well as TEMPO (molar ratio BPO to SFR 1:1.3) using otherwise identical composition of the polymerization solution.

Evaluation of Grafted Monoliths. The reversed phase properties of poly(S-co-DVB) before and after grafting with HEMA were evaluated in an isocratic flow system using an eluent consisting of methanol and water (80/20 v/v) at a flow rate of 0.5 mL/min. A homologous series from methyl to butyl benzoate were injected through a 20 μl loop and detected at 254 nm.

The amount of available cation exchange sites on the poly(S-co-DVB) grafted with sulfopropyl methacrylate was determined by its magnesium ion uptake capacity when the column was equilibrated with a solution of 100 mM $MgCl_2$ and carefully washed with deionized water. The $Mg^{2+}$ was eluted with 100 mM $CaCl_2$ and subsequently determined by atomic absorption spectrometry using a Varian (Walnut Creek, Calif.) AA-875 spectrometer.

Results and Discussion

SFR Polymerization Kinetics. The primary goal was to develop a system for preparation of porous objects under SFR control, where the polymerization kinetics is improved compared to the TEMPO mediated system which we have recently reported on[6]. As has been discussed in a number of papers, SFR mediated radical polymerizations are considerably slower than traditional radical polymerizations[1,6,10,11]. Also, as was described on TEMPO mediated monolith polymerizations[6], a monolith polymerization system based on this SFR suffers from problems with monomer conversion, since only approx. 85% of the monomers were consumed after 48 hours of polymerization at 130° C., when the BPO:TEMPO ratio was kept at 1:1.2. It was found that the conversion rate could be improved by addition of an additional catalyst (acetic anhydride)[12,13] to the polymerization mixture[6]. Veregin et al.[14] reported that carboxy-PROXYL is an alternative to TEMPO for SFR polymerization of styrene to yield polymers with low polydispersity. They estimated the energy required to break the bond between the SFR and a styrene-1-mer in solution to be 113 kJ/mol for the carboxy-PROXYL mediated system, compared to 129 kJ/mol in the case of TEMPO. Although these values correspond to a model compound comprised of only one monomer unit, it indicates that carboxy-PROXYL might be a better choice than TEMPO for a monolith synthesis, when a more rapid polymerization kinetics is sought.

Figure 2:
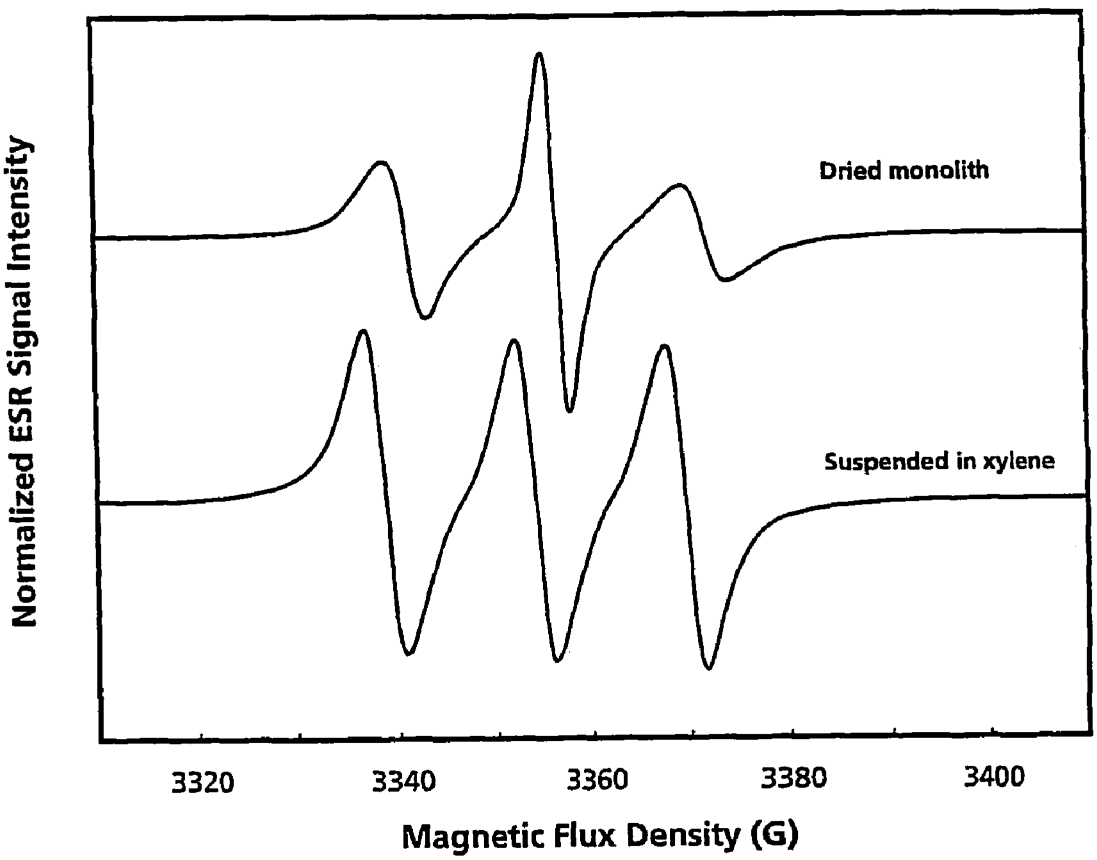
FIG. 2 presents an electron spin resonance (ESR) spectra of a poly(styrene-co-divinylbenzene) monolith sample polymerized in the presence of carboxy-PROXYL, following heating in the ESR cavity for 20 minutes at 398 K. Experiments were carried out with the monolith in dry state, and when suspended in xylene.
Figure 3:
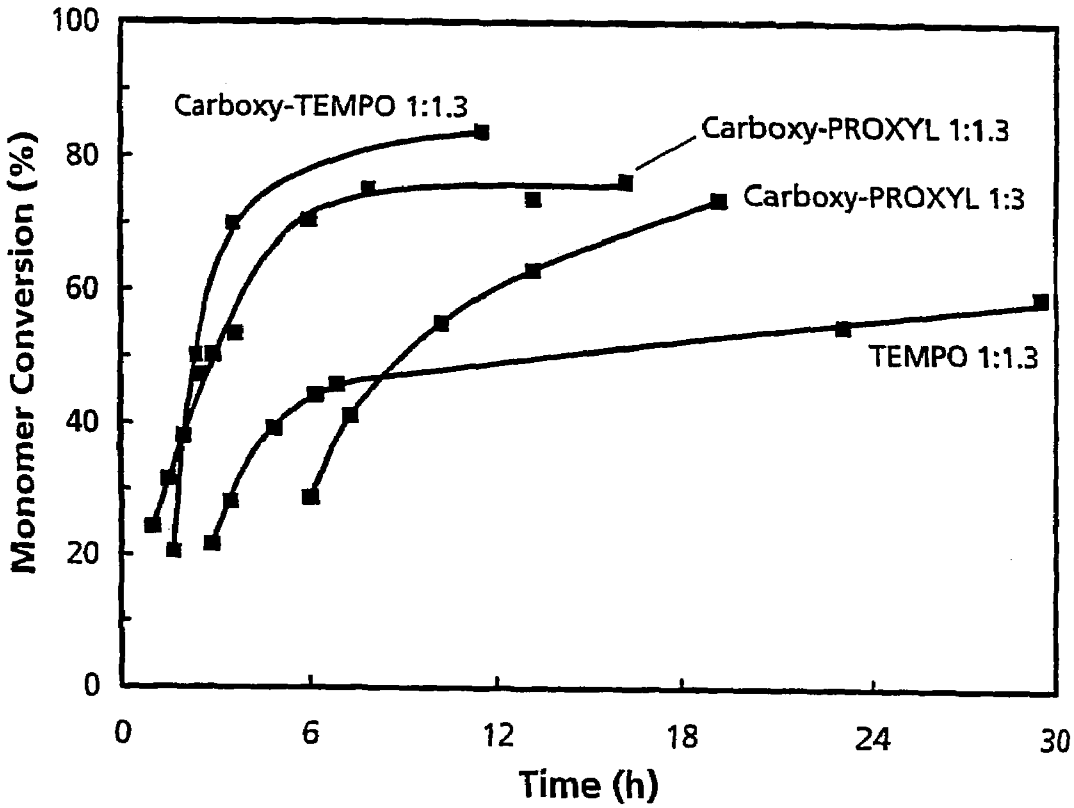
FIG. 3 describes monomer conversion at 130° C. as styrene and divinylbenzene were polymerized in the presence of TEMPO and carboxy-TEMPO at a molar ratio of 1:1.3, and carboxy-PROXYL at two different molar ratios.

In order to investigate the suitability of carboxy-PROXYL in monolith synthesis, ESR experiments were carried out on crushed poly(S-co-DVB) material prepared using a molar ratio of 1:1.3 between BPO and carboxy-PROXYL. The activation energy needed for breaking the bond between carboxy-PROXYL and the crosslinked poly (S-co-DVB) monoliths was estimated from Arrhenius plots of the initial release rate of free radicals at different temperatures. Although ESR spectra for polymeric matrixes often suffer from anisotropic effects and poor line shapes which make quantitative measurements difficult[15], we reached the conclusion that it was not only possible to release radicals from the polymer by applying renewed heating, but also that the measured bond breaking energy (approx. 113 kJ/mol) closely matched the previously reported experimental value for a styrene-1-mer[14] (FIG. 1). The shapes of the ESR spectra obtained for crushed monolith samples, in the dry state and suspended in xylene, are visualized in FIG. 2. The polymerization kinetics in SFR mediated monolith syntheses at 130° C. is shown in FIG. 3. At a BPO:carboxy-PROXYL ratio of 1:1.3, a conversion of more than 75% was reached after 16 h of reaction. When using TEMPO at the same molar ratio, the conversion remained below 60% even after nearly 30 h of reaction. Even with an extreme BPO:carboxy-PROXYL ratio of 1:3, polymerization took place at a reasonable rate and a conversion of 74% was reached in 20 h. It should be noted that such high levels of TEMPO cannot be used without catalyst because of a severe decrease in polymerization rate, evident from a delay of visible precipitation in polymerization mold[6]. The fast polymerization with carboxy-PROXYL is also evident from the similarly shaped SEC curves produced by poly(S-co-DVB) monoliths polymerized for 8 h and 20 h, respectively (data not shown). This indicates that the pore size distribution is established already after 8 h and remains essentially the same within the tested time interval. In the search for other SFR candidates, it was noticed that carboxy-TEMPO shows polymerization kinetics comparable to carboxy-PROXYL (FIG. 3).

Figure 4:
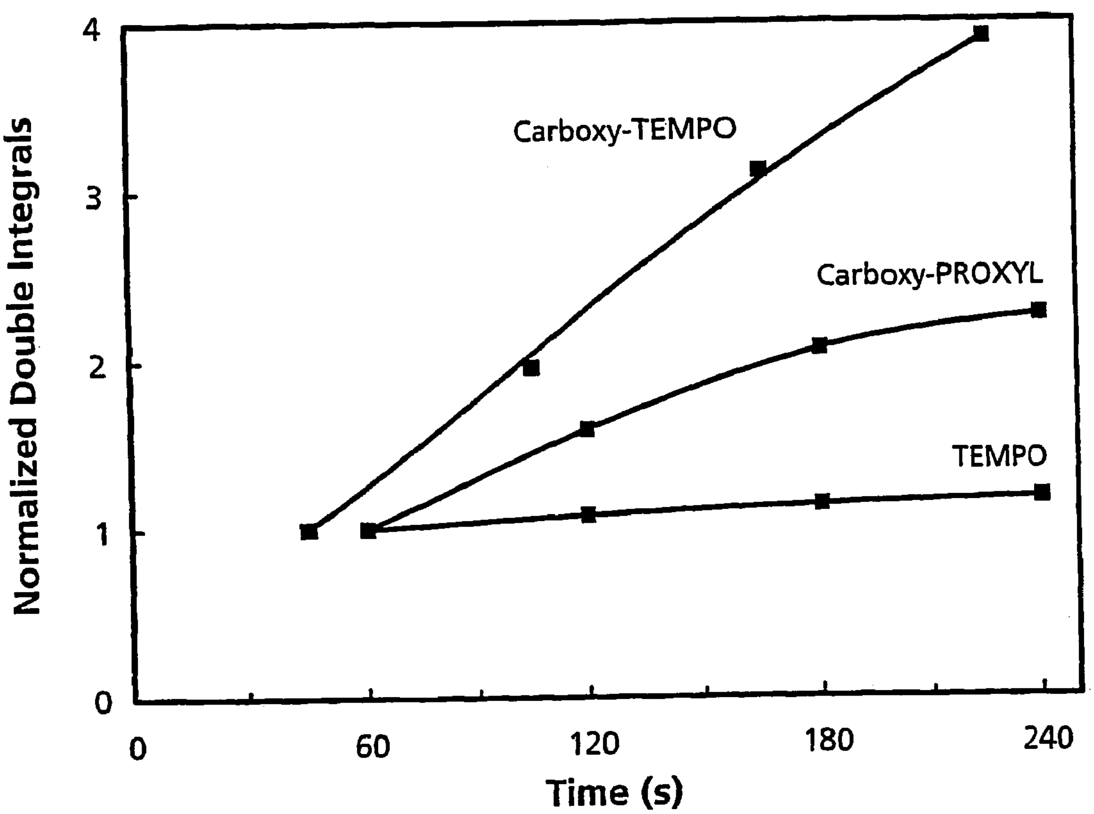
FIG. 4 shows release of SFR from poly(styrene-co-divinylbenzene) monoliths synthesized with carboxy-TEMPO, carboxy-PROXYL, and TEMPO, using BPO:SFR molar ratios of 1:1.3. Prior to heating in the ESR spectrometer, the samples were suspended in xylene and each measurement was carried out at 399 K.

SFR mediated radical polymerizations have the advantage of running in absence of the Trommsdorff effect[16]. Another advantage of the concept is the prospect of accomplishing controlled surface specific grafting into the pore structure of a poly(S-co-DVB) monolith by utilizing the dormant SFR-capped radicals remaining after the polymerization[6]. As mentioned above, our ESR experiments revealed that it is possible to release carboxy-PROXYL from a washed and crushed porous monolithic poly(S-co-DVB) synthesized with this SFR, simply by heating the material in xylene within the cavity of the spectrometer to the required temperature. The release of SFR during the first four minutes of heating (the relatively linear part of release curves) at 399 K is shown in FIG. 4 for carboxy-PROXYL, TEMPO, and carboxy-TEMPO. The respective slopes of these curves confirm the results from the conversion experiment, indicating that both the carboxy-functionalized SFRs provide for a faster kinetics than TEMPO.

Pore Characteristics. The porous properties of monoliths based on poly(S-co-DVB) and poly(2,3-epoxypropyl methacrylate-co-ethylene dimethacrylate) [GMA-co-EDMA] can be controlled during the synthesis step by varying the polymerization temperature, by the thermodynamic quality of the porogenic solvent, or by the crosslinking density[7]. The reaction parameters affecting the pore formation process in these mold polymerizations were valid both for the styrene/divinylbenzene and the GMA/EDMA monomer systems. Similar rules applies to methacrylate monolith systems under photopolymerization[17], and thus constitute general guidelines for optimizing the porous properties of monoliths towards a desired flow through application. However, for SFR-mediated mold polymerizations, the rules established for low temperature, traditional radical polymerizations (55–80° C.) could not be translated to the new, rather extreme polymerization conditions required when an SFR is present in the polymerization mixture. A fundamentally different pore size distribution is obtained at 130° C., compared to the typical bimodal distribution seen in polymerizations at lower temperature, regardless if TEMPO is added or not[6]. So, addition of TEMPO allows control of the polymerization and enables surface-initiated grafting, but it does not provide the anticipated control over the pore size distribution.

Poly(ethylene glycol) as Polymeric Porogen. The slope of the SEC calibration curve provides a good estimate of the practical pore size distribution when the monolith is operated with solvent, as will be the case in a flow through application. Conventional (non-SFR) polymerizations of poly(S-co-DVB) monoliths often show a relatively low separation power with respect to molecular weight, i.e., most of the molecular weight standards have similar access to the pore structure. This lack of molecular weight discrimination is a logical consequence of the bimodal pore size distribution, where most of the pore volume is accounted for by pores with diameters around 1,000 nm[7]. In TEMPO mediated polymerization of poly(S-co-DVB) using 1-dodecanol as the porogen, as described in our previous paper[6] the monoliths contain pores ranging from above 1,000 nm to less than 10 nm, providing for a considerably better size exclusion capability. However, the high back pressure in such monoliths limits the applicable flow rate to only low levels.

Figure 5:
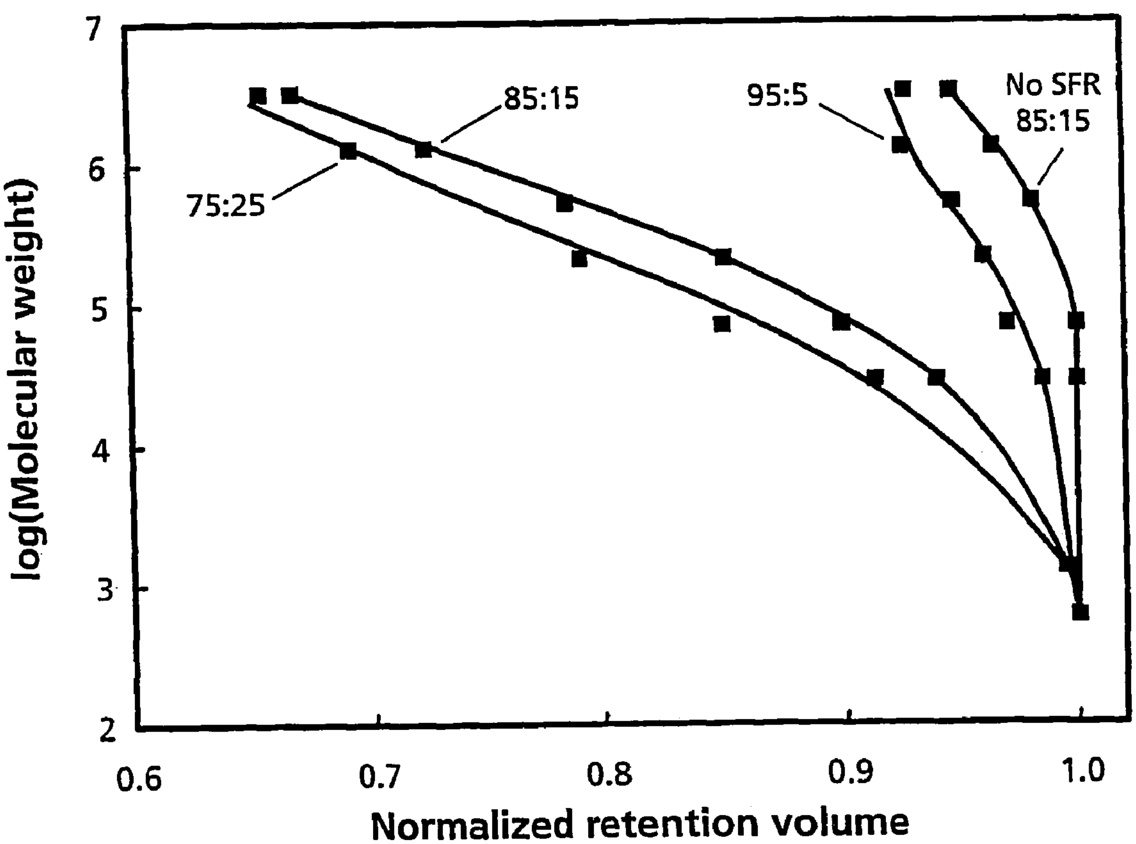
FIG. 5 discloses size exclusion chromatography calibration curves for poly(styrene-co-divinylbenzene) monoliths polymerized at 130° C. with different PEG:1-decanol ratios, using carboxy-PROXYL as SFR at 1:1.3 molar ratio. A reference sample polymerized without SFR at a PEG:1-decanol ratio of 85:15 is also included. Polystyrene (PS) molecular weight (MW) standard samples were eluted with tetrahydrofuran (THF)
Figure 6:
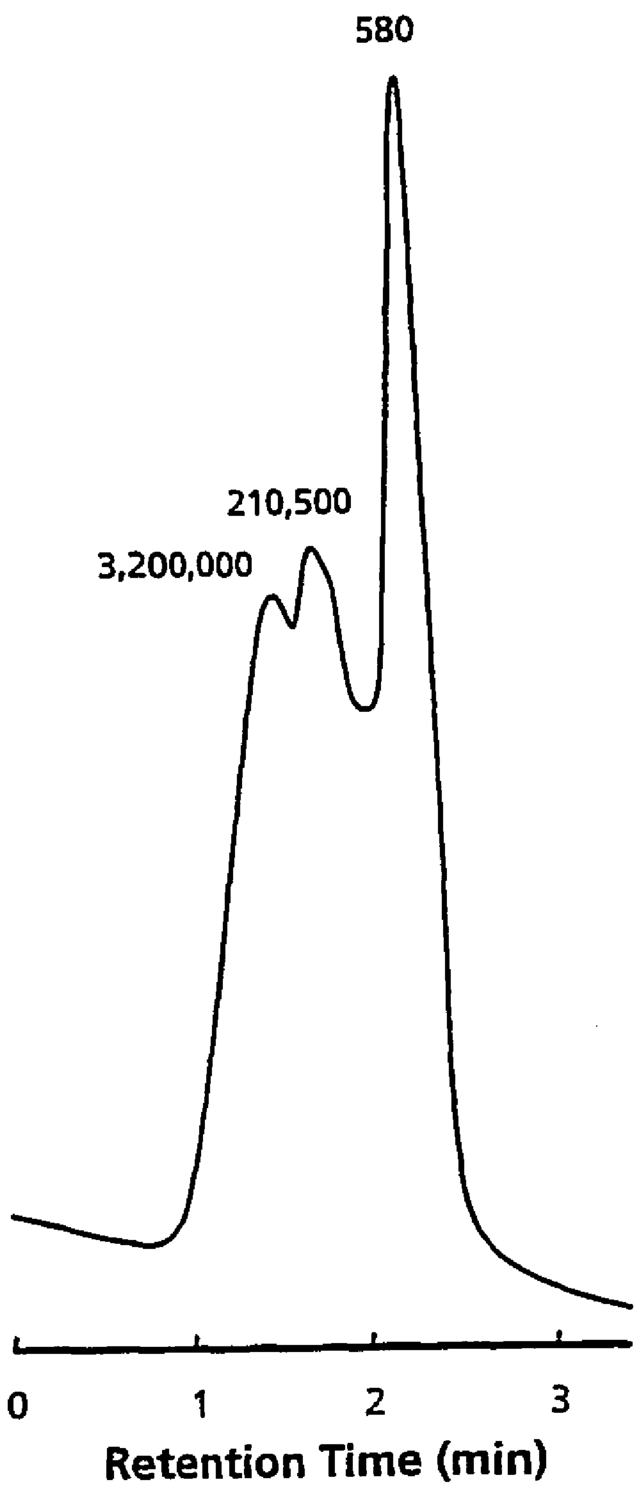
FIG. 6 shows a size exclusion chromatographic elution profile of a 20 µl sample of a polystyrene mixture (1.0 mg/ml with respect to each PS) at the molecular weights indicated in the figure, using a poly(styrene-co-divinylbenzene) monolith (50 mm by 8 mm i.d.)prepared using the composition described in Table 1, Exp. 4. The polystyrene mixture was eluted with THF at a flow rate of 1.0 ml/min, and detected by UV spectrophotometry at 254 nm.
Figure 7:
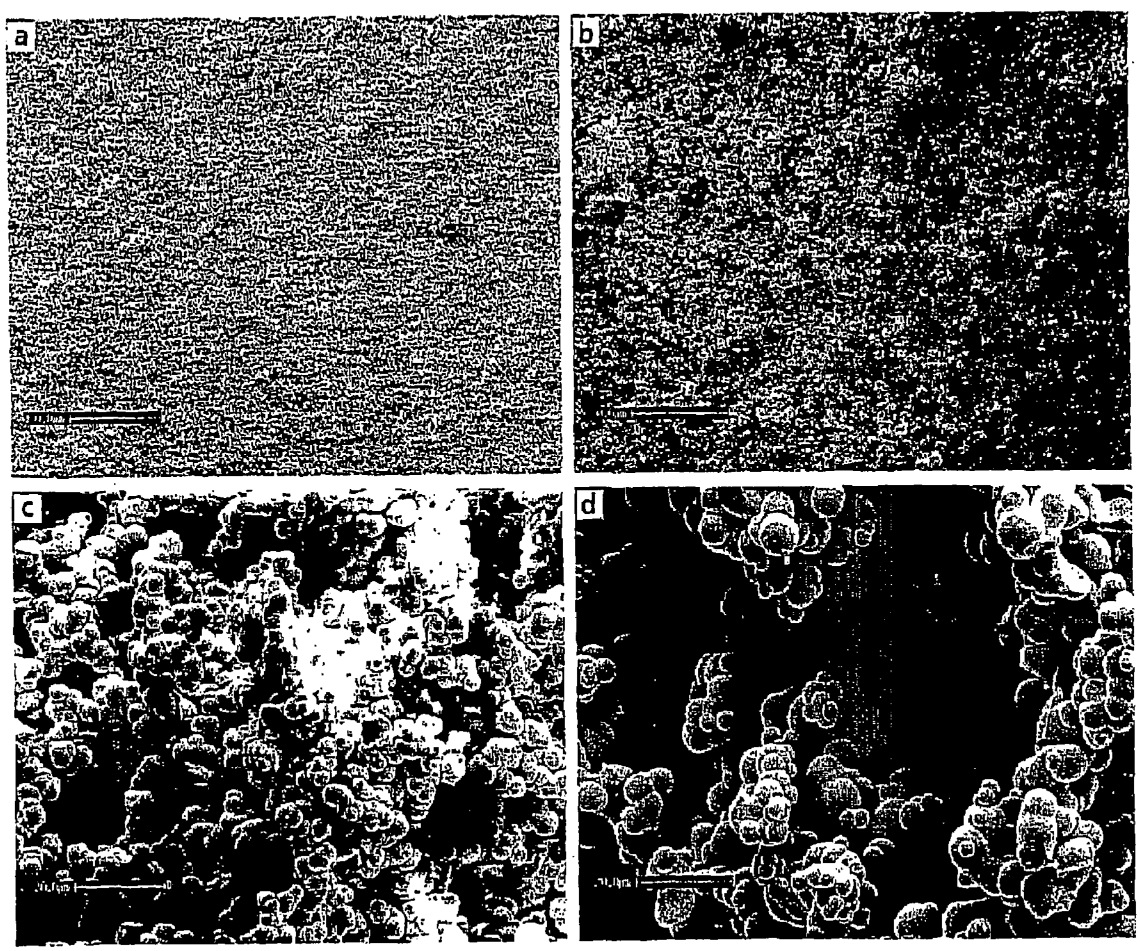
FIG. 7 discloses SEM micrographs of poly(styrene-co-divinylbenzene) monoliths polymerized at 130° C. with PEG:1-decanol ratios of 75:25 (a). 85:15 (b), 95:5 (c), and a reference example polymerized with TEMPO instead of carboxy-PROXYL (PEG:1-decanol ratio of 85:15)(d)

The above features of monoliths prepared in SFR mediated polymerizations demonstrate the need of developing a porogen combination, which will allow the pore size distribution to be easily tuned throughout the synthesis. In the search for such system, we have found that polyethylene glycol (PEG) with a molecular weight of 400 serves as a useful porogen constituent together with a long chain alcohol such as 1-decanol. FIG. 5 shows the SEC calibration curves for poly(S-co-DVB) monoliths synthesized using various compositions of the porogen phase. By this approach, the pore size distribution can be readily adjusted through changes in the ratio between the porogen components. The SEC curves show that pore size distributions containing mainly larger pore sizes can be obtained when the relative concentration of PEG is increased, producing materials that show no significant separation between molecular weights standards. However, when the amount of 1-decanol was increased at the expense of the polymeric porogen, a separation capability was obtained across the entire tested molecular weight range from 580 to 3,220,000. In fact, for a poly(S-co-DVB) monolith polymerized in a 2.5 mL column filled with a polymerization solution containing 50% monomer by weight, the retention volume for the highest and lowest molecular weight standard, respectively, differs by 0.73 mL. This translates to about 29% of the total column volume. FIG. 6 shows the separation profile obtained for a polystyrene standard mixture (MW 3,220,000; 210,500; and 580, respectively) using a short (50 mm) poly(S-co-DVB) monolith. Considering the unusually short column and the very low back pressure in this SEC separation, this new polymer composition should be useful for preparing long SEC columns. FIG. 7 shows SEM micrographs corresponding to the different porogen ratios in FIG. 5 and visualizes the striking effect of the porogen composition on the porosity. The major contribution to the surface area of macroporous polymers is normally obtained from pores smaller than 10 nm, and surface area measurements thus provide supplementary information about the pore characteristics. Table 1 reveals that the surface area was dramatically increased from 2.6 to 182.9 $m^2/g$ by decreasing the PEG to 1-decanol ratio from 95:5 to 75:25. In our previous reports concerning the preparation of poly(S-co-DVB) monoliths using either low temperature (non-SFR) polymerizations or the TEMPO moderated polymerization approach, high surface areas have been accompanied by a sacrifice of the hydrodynamic properties of the monoliths. Table 1 shows that a higher percentage of PEG with respect to 1-decanol translates into higher flow permeability, as indicated by SEC curves, and evident from the large transecting pores in the SEM micrographs for the higher PEG porogen concentrations. Even for the polymers with the highest surface area in the series, the back-pressures were well within the operable range for liquid chromatography, and we thus conclude that this approach resolves the conflicting demands for high surface area and reasonable back pressure.

The course of an SFR mediated monolith polymerization is more easily investigated than the corresponding polymerization in the absence of SFR, since the prolonged polymerization period provides an expanded time window for studying the nucleation and precipitation in the mold as a function of polymerization time. Mixtures containing different PEG:1-decanol ratios and a BPO:PROXYL ratio of 1:1.3 were consequently polymerized in vials at 130° C., and the it was concluded that the precipitation order was dependent on the PEG content. Higher PEG:1-decanol ratios resulted in faster precipitation in the solution, as a consequence of the poor solubilization power of PEG with respect to the growing polymer chains.

Figure 8:
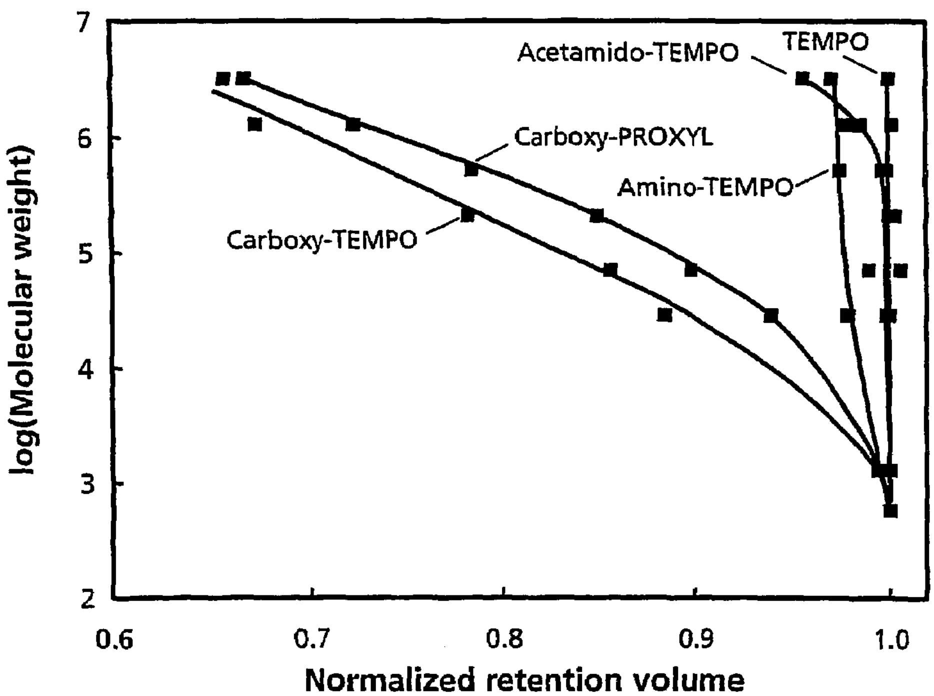
FIG. 8 presents size exclusion chromatographic calibration curves for poly(styrene-co-divinylbenzene) monoliths polymerized at 130° C. with PEG:1-decanol ratio of 85:15 using different SFRs with a molar ratio of 1.3 to 1 with respect to BPO. Polystyrene MW samples are eluted with THF.

Effect of SFR Selected. Despite the structural similarities between TEMPO, carboxy-PROXYL, and carboxy-TEMPO, the type of SFR chosen affected not only kinetics and conversion of the polymerization as discussed above, but also the pore size distribution of the product. The SEC curve for a sample polymerized using polymerization conditions as described in FIG. 5 (PEG:1-decanol ratio 85:15), but substituting TEMPO for carboxy-PROXYL is seen in FIG. 8. It is apparent that the polymer contains much larger pores and has forfeited the size-based separation capability seen for the carboxy-PROXYL mediated polymers at the corresponding PEG to 1-decanol ratio. Also, the scanning electron micrograph for the TEMPO moderated monolith (FIG. 7*d*) reveals that the structure is composed of large interconnected globules and large pores, whereas the carboxy-PROXYL moderated monolith with the same PEG:1-decanol ratio showed considerably smaller macropores (FIG. 7*b*). Table 1 shows that the surface areas of the resins are strongly dependent on the choice of SFR. The TEMPO moderated polymer has a very low surface area (1.2 $m^2/g$) while carboxy-PROXYL yields high surface area resins (72.1 $m^2/g$) at the same PEG:1-decanol ratio.

Since the porosity of the reference polymer synthesized without SFR resembles that of the TEMPO moderated polymer, we wanted to assess whether the unique pore size distribution of the carboxy-PROXYL mediated monoliths originated from the dissociable and hence potentially anionic carboxylic functionality of carboxy-PROXYL, rather than the altered polymerization kinetics (recall that monoliths without SFR added polymerized very rapidly[6]). As mentioned above, the conversion kinetics for a polymerization carried out in presence of carboxy-TEMPO (FIG. 3) was comparable to that for carboxy-PROXYL. The carboxy-TEMPO moderated polymer also showed the highest surface area among the SFRs tested (Table 1). Because surface chemistry apparently plays an important role in the monolith precipitation processes, it was interesting to investigate other SFRs with polar and charged headgroups (Scheme 1). Additional monoliths were therefore prepared using acetamido-TEMPO, amino-TEMPO, and trimethylammonio-TEMPO iodide as moderators. The pore size distribution of these monoliths were investigated by SEC, and the calibration curves are shown in FIG. 8. The surprising result shows that the SEC pore size distributions are nearly identical for all SFRs tested, except for the polymers synthesized with carboxy-PROXYL or carboxy-TEMPO. Trimethylammonio-TEMPO iodide was included in the test since it carries a permanent cationic charge on the quaternized ammonium group, but there were difficulties associated with dissolving trimethylammonio-TEMPO iodide in the polymerization media which made the actual BPO:SFR ratio in solution lower than the intended level of 1:1.3. Nevertheless, for comparison purposes, SEC measurements were made, and the polymer showed no separation capability with respect to molecular weight.

In situ Grafting of Hydrophilic Monomers. In our recent report on TEMPO moderated monoliths[6], we were able to demonstrate that vinylic monomers could be successfully grafted onto the SFR terminated monolithic poly(S-co-DVB). However, the porous properties of these monoliths did not allow flow through the pore structure at flow rates and back pressures acceptable in most flow through applications, so these studies were exclusively carried out as batch experiments on material that had been crushed to powder.

Figure 9:
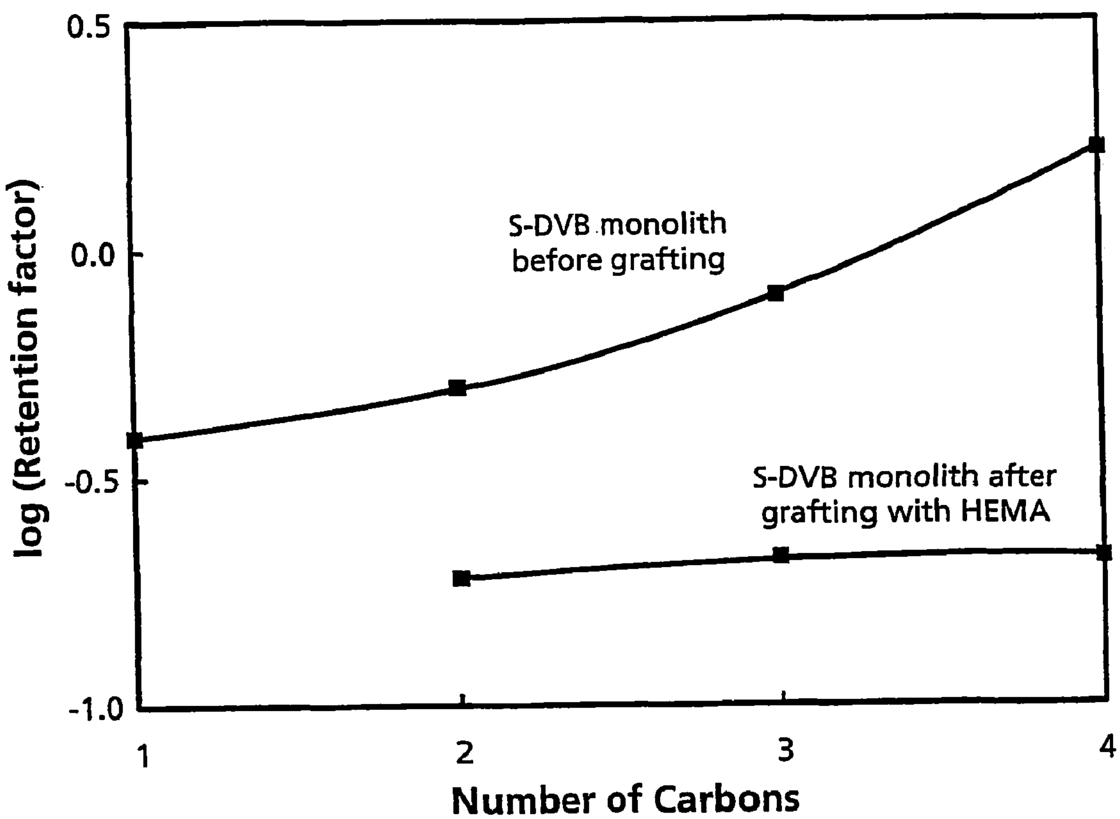
FIG. 9 relates to reverse phase retention behavior of a poly(styrene-co-divinylbenzene) monolith before and after grafting with poly-HEMA. The monolith was synthesized from a polymerization solution containing 4 parts by weight of monomers and 6 parts of porogen (PEG:1-decanol 4:1) and subsequently polymerized at 130° C. using a BPO to carboxy-PROXYL ratio of 1:1.2.

Our new concept allowed us to prepare SFR-mediated poly(S-co-DVB) monoliths with high flow permeablity in situ, and we have thus been able to perform surface-initiated grafting on poly(S-co-DVB) monoliths by simply filling the internal pore structure with a solution containing the monomer destined to be grafted, followed by heating to a temperature where the SFR-polymer bond again becomes labile[14]. For example, hydrophilization of poly(S-co-DVB) monoliths was achieved by grafting of hydroxyethyl methacrylate (HEMA) onto the pore structure utilizing the carboxy-PROXYL capped "living" polymer terminals. FIG. 9 shows the changes in surface hydrophobicity engendered by the HEMA grafting procedure, as determined by the interaction with aromatic compounds in reversed phase chromatography of a poly(S-co-DVB) monolith before and after the HEMA grafting step. Before grafting, the retention of the compounds in an aromatic homologous series increased with the number of carbons, whereas after the grafting reaction, the internal volume of the monolith was decreased by 11.5% and there was essentially no retention difference between the members of the homologous series (FIG. 9). The grafting was accompanied only by a slight increase in back-pressure. Although the monoliths were carefully washed after the grafting procedure, one should bear in mind that the high temperatures used may also have caused spontaneous polymerization in solution, leaving trapped material in the pores. However HEMA grafting solution did not polymerize spontaneously at 130° C. in the absence of an SFR monolith. Likewise, such uncontrolled processes can have caused a spontaneous grafting to the carboxy-PROXYL capped poly (S-co-DVB), although this process should be quite effectively retarded by the released SFR.

Figure 10:
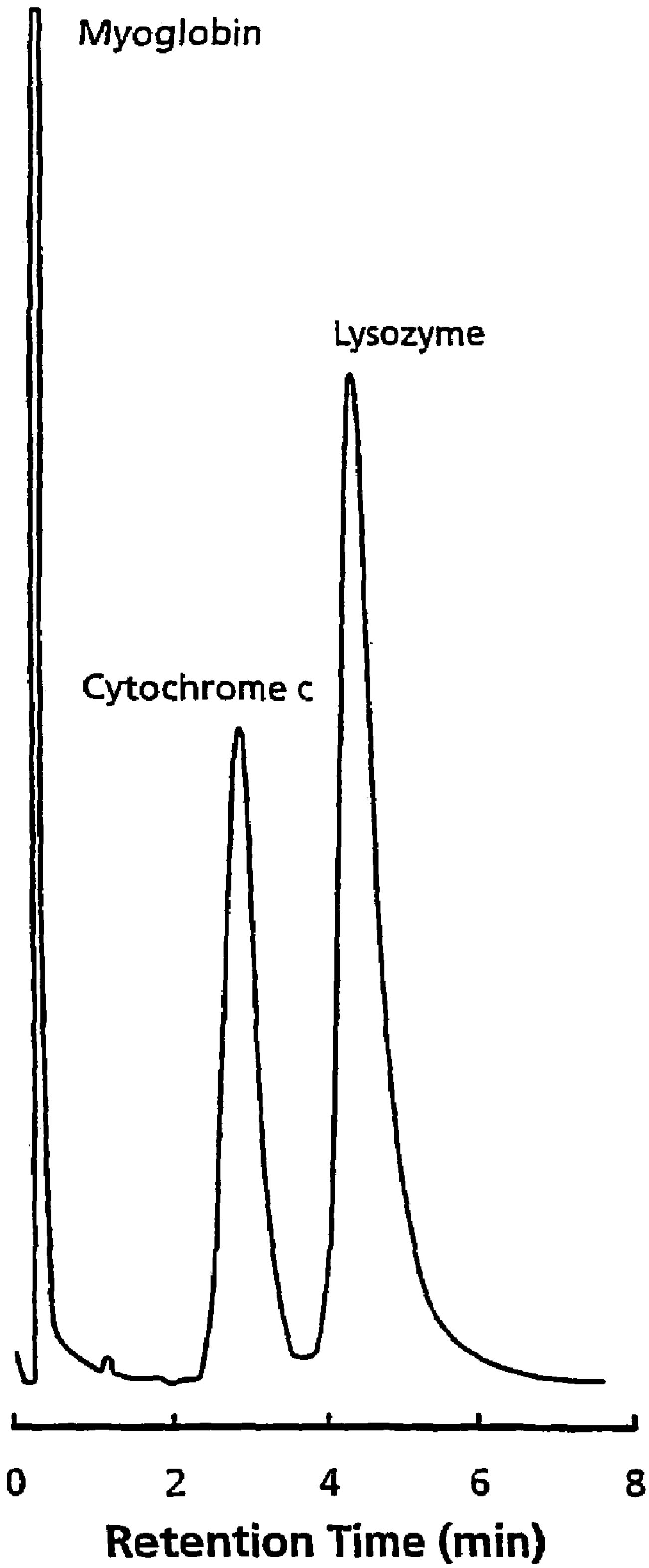
FIG. 10 describes cation-exchange separation of 20 µl of a protein mixture (0.5 mg/ml with respect to each protein) using a poly(styrene-co-divinylbenzene) monolith grafted with 3-sulfopropylmethacrylate in dimethyl sulfoxide (DMSO). Elution conditions were a linear gradient ranging from 20 to 100% eluent B (0.25 M NaCl in 20 mM phosphate buffer pH 7) at a flow rate of 1.0 m/min.

We were also able to use the dormant carboxy-PROXYL capped terminals to initiate grafting of poly(sulfopropyl methacrylate). This converted the hydrophobic poly(S-co-DVB) monolith into a strong cation exchanger, which was tested for separation of basic proteins in the cation-exchange mode. For this purpose, the columns were scaled down to 50 mm by 2.6 mm i.d. FIG. 10 shows a cation exchange separation of myoglobin, cytochrome c, and lysozyme using a linear NaCl gradient as eluent. The peak shapes indicate that the surface properties were homogeneous, and the ability to elute these proteins from the modified poly(S-co-DVB) monoliths verify a low density of ungrafted patches, which would have caused irreversible retention on the highly hydrophobic poly(S-co-DVB) surface. The amount of grafted sulfopropyl groups available was evaluated by virtue of their ion-exchange capacity, loading the material with $Mg^{2+}$ followed by displacement with $Ca^{2+}$. The uptake capacity was found to be 37 μmole $Mg^{2+}$/g polymer, corresponding to a monovalent ion exchange capacity of 74 μmole/g polymer.

REFERENCES (1) (a) Georges, M. K.; Veregin, R. P. N.; Kazmaier, P. M.; Hamer, G. K. *Macromolecules* 1993, 26, 2987–2988. (b) Chong, B. K.; Le, T. T.; Moad, G.; Rizzardo, E.; Thang, S. H. *Macromolecules* 1999, 32, 2071–2074. (c) Mayadunne, R. A.; Rizzardo, E.; Chiefari, J.; Krstina, J.; Moad, G.; Postma, A.; Thang, S. H. *Macromolecules* 2000, 33, 243–245. (d) Moffat, K. A.; Hamer, G. K.; Georges, M. K. *Macromolecules* 1999, 32, 1004–1012. (e) Hawker, C. J. *Angew. Chem., Int. Ed. Engl.* 1995, 34, 1456–1459. (f) Hawker, C. J. *J. Am. Chem. Soc.* 1994, 116,11185–11186. (g) Nishikawa, T.; Kamigaito, M.; Sawamoto, M. *Macromolecules* 1999, 32, 2204–2209. (h) Matyjaszewski, K.; Wei, M. L.; Xia, J. H.; Mcdermott, N. E. *Macromolecules* 1997, 30, 8161–8164. (i) Patten, T. E.; Matyjaszewski, K. *Adv. Mater.* 1998, 10, 901–915. (j) Fukuda, T.; Goto, A.; Ohno,K. *Macromol. Rapid Commun.* 2000, 21, 151–165. (k) Fischer, H. *J. Polym. Science Part A, Polym. Chem.* 1999, 37, 1885–1901.

(2) (a) Hawker C. J. *Angew. Chem., Int. Ed. Engl.* 1995, 34, 1456–1459. (b) Hodges, J. C.; Harikrishnan L. S.; Ault-Justus, S. *J. Comb. Chem.* 2000, 2, 80–88. (c) Miwa, Y.; Yamamoto, K.; Sakaguchi, M.; Shimada, S. *Macromolecules* 1999, 32, 8234–8236.

(3) (a) Georges M. K.; Hamer G. K.; Listigovers N. A. *Macromolecules* 1998, 31, 9087–9089. (b) Malmström, E. E.; Hawker, C. J. *Macromol. Chem. Phys.* 1998, 199, 923–935. (c) Benoit, D.; Harth, E.; Fox, P.; Waymouth, R. M.; Hawker, C. J. *Macromolecules* 2000, 33, 363–370. (d) Ohno, K.; Izu, Y.; Yamamoto, S.; Miyamoto, T.; Fukuda, T. *Macromol. Chem. Phys.* 1999, 200, 1619–1625. (e) Georges, M. K.; Veregin, R. P. N.; Hamer, G. K.; Kazmaier, P. M. *Macromol. Symp.* 1994, 88, 89–103. (f) Chen X. Y.; Gao B.; Kops J.; Batsberg W. *Polymer* 1998, 39, 911–915.

(4) (a) Bon, S. A.; Bosveld, M.; Klumperman, B.; German, A. L. *Macromolecules* 1997, 30, 324–326. (b) Uzulina, I.;

Kanagasabapathy, S.; Claverie, J. *Macromol. Symp.* 2000, 150, 33–38. (c) Chambard, G.; de Man, P.; Klumperman, B. *Macromol. Symp.* 2000, 150, 45–51.

(5) (a) Hölderle, M.; Baumert, M.; Mullhaupt, R. *Macromolecules* 1997, 30, 3420–3422. (b) Charmot, D.; Corpart, P.; Adam, H.; Zard, S. Z.; Biadatti, T.; Bouhadir, G. *Macromol. Symp.,* 2000,150, 23–32. (c) Gabaston, L. I.; Jackson, R. A.; Armes, S. P. *Macromolecules* 1998, 31, 2883–2888.

(6) Peters, E. C.; Svec, F.; Fréchet, J. M. J.; Viklund, C.; Irgum, K. *Macromolecules* 1999, 32,6377–6379.

(7) Viklund, C.; Svec, F.; Fréchet, J. M. J.; Irgum, K. *Chem. Mater* 1996, 8, 744–750.

(8) Benoit, D.; Chaplinski, V.; Braslau, R.; Hawker, C. J. *J. Am. Chem. Soc.* 1999, 121, 3904–3920.

(9) Meyer, U.; Svec, F.; Fréchet, J. M. J.; Hawker, C. J.; Irgum K. *Macromolecules,* submitted.

(10) George, M. K.; Veregin, R. P. N.; Kazmaier, P. M.; Hamer, G. K.; Saban, M. *Macromolecules,* 1992, 27, 7228–7229.

(11) Hawker, C. J. *Acc. Chem. Res.* 1997, 30, 373–382.

(12) Malmström, E.; Miller, R. D.; Hawker, C. J. *Tetrahedron* 1997, 53, 15225–15236.

(13) Butz, S.; Baethge, H.; Schmidt-Naake, G. *Angew. Makromol. Chem.* 1999, 270, 42–48.

(14) Veregin, R. P. N.; Georges, M. K.; Hamer, G. K.; Kazmaier, P. M. *Macromolecules* 1995, 28, 4391–4398.

(15) Miller, W. G. In *Spin II Labeling, theory and applications: Spin-labeled synthetic polymers;* Berliner, L. J. (Ed.), Academic Press, London, UK, 1979; pp 173–221.

(16) Saban, M. D.; Georges, M. K.; Veregin, R. P. N.; Hamer, G. K.; Kazmaier, P. K. *Macromolecules* 1995, 28, 7032–7034.

(17) Viklund, C.; Pontén, E.; Glad, B.; Irgum, K.; Hörstedt, P.; Svec, F., *Chem. Mater.* 1997, 9, 463–471.

TABLE 1

Surface areas and flow permeabilities of poly(S-co-DVB) monoliths[a].

| Polymer Exp # | SFR[b) (mol/mol) | PEG:1-decanol[c) (w/w) | Surface area[d) ($m^2$/g) | Slope of back-pressure curve[e) MPa(min)/mL |
|---|---|---|---|---|
| 1 | No SFR | 85:15 | 7.0 ± 0.2 | 0.5 |
| 2 | TEMPO | 85:15 | 1.2 ± 0.1 | 0.1 |
| 3 | C-TEMPO | 85:15 | 146.6 ± 0.6 | 12.1 |
| 4 | C-PROXYL | 85:15 | 72.1 ± 0.1 | 8.6 |
| 5 | C-PROXYL | 75:25 | 183.0 ± 3.0 | 9.7 |
| 6 | C-PROXYL | 95:05 | 2.6 ± 0.0 | 0.2 |

[a]The polymerization mixture contained 50% (w/w) monomers (styrene and divinylbenzene; 1:1) and 50% porogenic solvent (PEG 400 and 1-decanol), and the polymerization was carried out in 50 mm long by 8 mm i.d. columns at 130° C. for 10 hours;
[b)]the molar BPO:SFR ratio was kept at 1:1.3, except for a reference polymer that was polymerized without SFR;
[c)]weight ratio between PEG 400 and 1-decanol in the polymerization mixture;
[d)]surface area determined from the desorption curve for nitrogen;
[e)]flow permeability as determined by the slope of the back pressure curve when THF was pumped through the polymer.

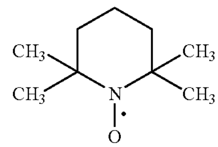

TEMPO

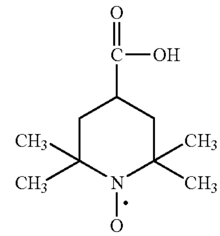

Carboxy-TEMPO

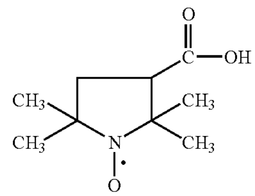

Carboxy-PROXYL

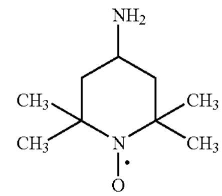

Amino-TEMPO

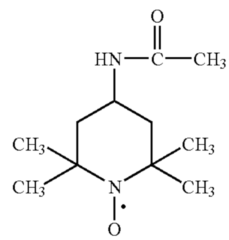

Acetamido-TEMPO

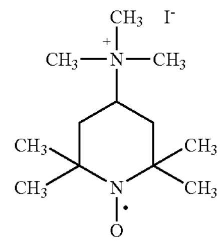

Trimethylammonio-TEMPO

The invention claimed is:

1. A column-packing material comprising a cross-linked porous poly (styrene-codivinylbenzene) polymer, which has been produced by polymerising styrene and divinylbenzene in the presence of an initiator, a carboxy-functionalized nitroxide stable free radical and polymeric porogens.

2. A column-packing material according to claim 1, characterised in that the crosslinked porous poly (styrene-co-divinylbenzene) polymer is a monolith.

3. A column-packing material according to claim 2, characterised in that the material has been grafted with a polymer comprising hydrophilic monomers.

4. A column-packing material according to claim 2, characterised in that the material has been grafted with a polymer comprising monomers comprising an ion-exchanging group.

5. A column-packing material according to claim 1, characterised in that the material has been grafted with a polymer comprising hydrophilic monomers.

6. A column-packing material according to claim 1, characterised in that the material has been grafted with a polymer comprising monomers comprising an ion-exchanging group.

7. A column for separating a plurality of different chemicals in a sample, said column comprising a hollow tube with two open ends, characterised in that the column contains a column-packing material according to claim 1.

8. A method for preparing a column-packing material comprising cross-linked porous poly (styrene-co-divinylbenzene) polymers, characterised by polymerising styrene and divinylbenzene in the presence of an initiator, a carboxy-functionalized nitroxide stable free radical and polymeric porogens.

9. A method for preparing a column-packing material according to claim 8, characterised in that the carboxy-functionalized nitroxide stable free radical is carboxy-PROXYL or carboxy-TEMPO.

10. A method for preparing a column-packing material according to claim 8, characterised in that the polymeric porogen is polyethylene glycol.

11. A method for preparing a column-packing material according to claim 8, characterized in that the cross-linked porous poly (styrene-co-divinyl benzene) polymers are cross-linked porous poly (styrene-co-divinylbenzene) monoliths.

12. In a method for producing a column-packing material comprising of cross-linked porous poly (styrene-co-divinylbenzene) polymers, comprising polymerizing with a carboxy-functionalized nitroxide stable free radical.

13. A method for producing a column-packing material according to claim 12, characterized in that the cross-linked porous poly (styrene-co-divinylbenzene) polymers are cross-linked porous poly (styrene-co-divinylbenzene) monoliths.

14. In a method for for producing a column-packing material comprising cross-linked porous poly (styrene-co-divinylbenzene) polymers, comprising polymerizing with polymeric porogens and a carboxy-functionalized nitroxide stable free radical.

15. A method for producing a column-packing material according to claim 14, characterized in that the cross-linked porous poly (styrene-co-divinylbenzene) polymers are cross-linked porous poly (styrene-co-divinylbenzene) monoliths.

* * * * *